United States Patent
Lee et al.

(10) Patent No.: US 6,924,471 B2
(45) Date of Patent: Aug. 2, 2005

(54) LIGHT APERTURE USED WITH IMAGING MACHINE

(75) Inventors: Chun-Yu Lee, Tu-Chen (TW);
Ga-Lane Chen, Fremont, CA (US);
Ming-Chiang Tsai, Tu-Chen (TW);
Tsung Wei Chiang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/871,425

(22) Filed: Jun. 18, 2004

(65) Prior Publication Data

US 2004/0256540 A1 Dec. 23, 2004

(30) Foreign Application Priority Data

Jun. 18, 2003 (TW) ..................................... 92211135 U

(51) Int. Cl.[7] .......................... H01J 40/14; H01L 27/14
(52) U.S. Cl. .................... 250/208.1; 250/216; 257/434; 257/435
(58) Field of Search .............................. 250/208.1, 216, 250/239, 214.1; 257/431, 432, 433, 434, 435; 359/894

(56) References Cited

U.S. PATENT DOCUMENTS

| 4,425,501 | A | | 1/1984 | Stauffer | |
|---|---|---|---|---|---|
| 4,694,185 | A | * | 9/1987 | Weiss | ....................... 250/208.1 |
| 5,519,205 | A | * | 5/1996 | Rostoker | ................. 250/208.1 |

* cited by examiner

Primary Examiner—Kevin Pyo
(74) Attorney, Agent, or Firm—Wei Te Chung

(57) ABSTRACT

A light aperture apparatus (1) used with an auto imaging machine comprises an aperture mask (30), a transparent structure (20), and an circuit chip (10), wherein the aperture mask is constructed of an opaque material and has a plurality of holes formed therein. The further the hole is from a center of the aperture mask, the larger the diameter of the hole is. The transparent structure has a plurality of lenslets (26) on it. Each lenslet corresponds in position to a hole of the aperture mask. The circuit chip has a plurality of detector areas (14) surrounded by non-detector areas (15). Each detector area corresponds in position to a lenslet on the transparent structure.

8 Claims, 4 Drawing Sheets

LIGHT APERTURE USED WITH IMAGING MACHINE

FIELD OF THE INVENTION

The present invention relates to a light aperture, and particularly to an aperture which can adjust and equalize light intensity for an imaging machine such as auto focusing cameras.

BACKGROUND OF THE INVENTION

In recent years auto focusing cameras have become more and more popular. One of the important performance characteristics for judging imaging quality of an auto focusing cameras is distinctness and even. FIG. 5 shows an aperture apparatus 100 disclosed in U.S. Pat. No. 4,425,501 for use in an auto focusing cameras. The aperture apparatus 100 comprises an integrated circuit chip 110 which has a plurality of detector pairs 111 positioned thereon, a transparent member 120, an aperture mask 130, a corrector lens 140, and a filter 150. The aperture mask 130 is constructed of an opaque material and is formed with a plurality of small apertures 131 defined therein. The transparent member 120 has a plurality of lenslets 121 formed thereon. When imaging, light from a remote object is incident upon the filter 150 and is first filtered, and then is transmitted through the corrector lens 140 so that it is substantially collimated. The light is then incident upon the aperture mask 130, but only the light incident on the small apertures 131 of the aperture mask 130 can pass through the aperture mask 130. Light passing through the apertures 131 is passed through lenslets 121 of the transparent member 120. This light is focused onto detector areas surrounding each detector pair 111 on the integrated circuit chip 110. The prior art apparatus 100 used the focusing of the lenslets to strengthen the light hitting the intensity of the detector areas and used the mask to prevent light from hitting the non-detector areas, thereby avoiding production of the spurious signal which can produce error in the circuit operation.

However, when the auto focusing camera works, a luminance from image is not always even. The luminance at the center of the image is generally strong and the luminance at the periphery of the image is so weak. This phenomenon of the decease in peripheral illumination has two cause vignetting and the Cos4law. In this prior art apparatus, a diameter of each aperture 131 is equal, whereas the illuminance of an image produced by the light passing through the corrector lens 140 gradually varies from strong at the center to weak at the periphery of the corrector lens 140. Since each of the apertures 131 of the mask is equal in diameter, light passing through the mask and incident on the lenslets 121 is strongest at the center of the circuit chip 110. The illuminance of an image at a center of the circuit chip 110 is brighter and the illuminance of an image at the periphery is dingier. This makes the whole image seem to be asymmetric and faint.

Therefore, an improved aperture apparatus for an auto imaging machine is desired which overcomes the disadvantages of the prior art.

SUMMARY OF THE INVENTION

An object of the present invention is to provide a light aperture apparatus for an auto imaging machine which provides a substantially equalized illuminance in every detector area of a circuit chip.

A light aperture apparatus used with an auto imaging machine comprises an aperture mask, a transparent structure, and a circuit chip, wherein the aperture mask is constructed of an opaque material and has a plurality of holes formed therein. The further a hole is from the center of the light aperture mask, the larger the diameter of the hole. The transparent structure has a plurality of lenslets formed thereon. Each lenslet aligns with a corresponding hole of the aperture mask. The circuit chip has a plurality of detector areas, each detector area corresponding to a lenslet of the transparent structure.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
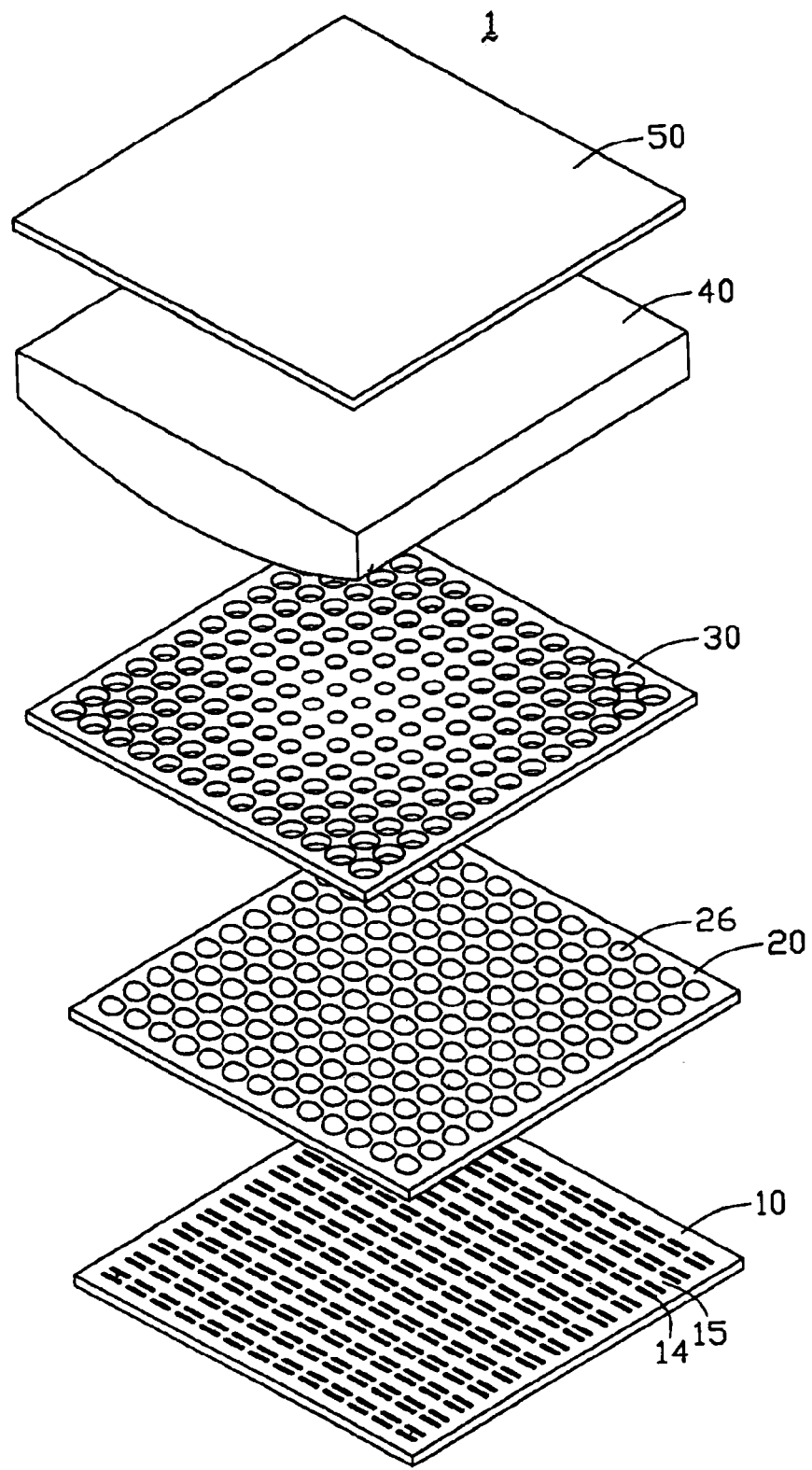
FIG. 1 is an exploded view of a light aperture apparatus of the present invention.

Referring now to the drawings in detail, FIG. 1 shows a light aperture apparatus 1 used in an auto imaging machine (not shown). The light aperture apparatus 1 comprises a circuit chip 10, a transparent structure 20, an aperture mask 30, a corrector lens 40, and a filter 50. The circuit chip 10 defines a plurality of detector areas 14 and non-detector areas 15. The non-detector areas 15 are alternately arranged with the detector areas 14. The non-detector areas 15 contain circuit components for processing signals from the detector areas 14. Each detector area 14 contains a pixel (not labeled).

The transparent structure 20 is mounted on the circuit chip 10. The transparent structure 20 has a plurality of lenslets 26 formed thereon to allow light to pass through, wherein each lenslet 26 corresponds to one detector area 14 of the circuit chip 10.

Figure 2:
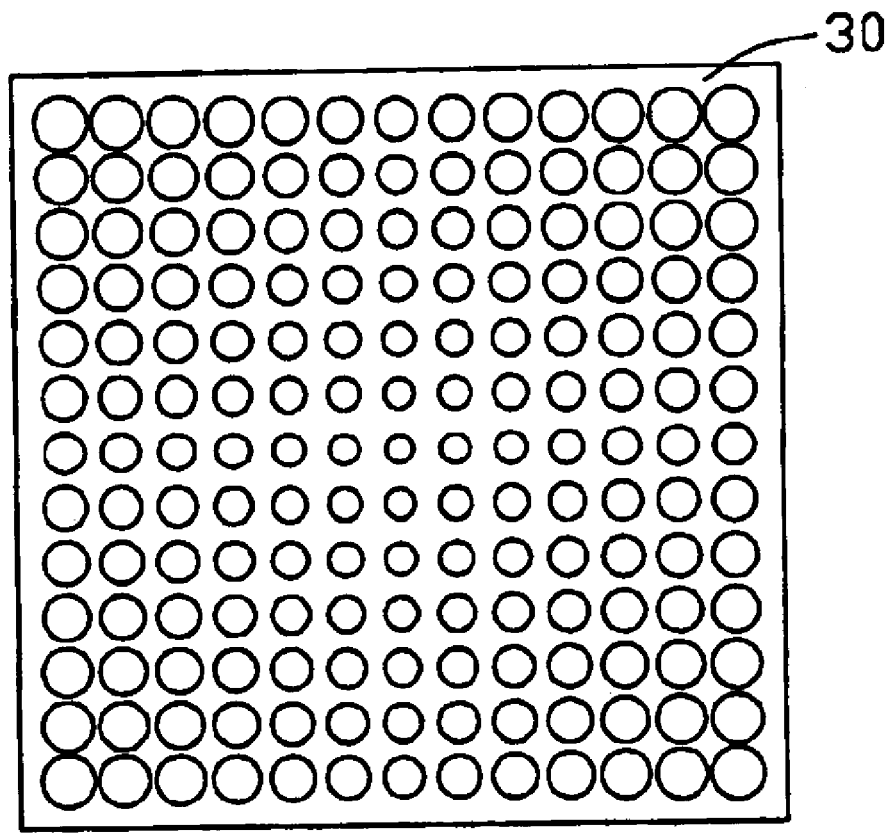
FIG. 2 is a plan view of an aperture mask of FIG. 1.

Referring to FIG. 2, the aperture mask 30 is mounted on the transparent structure 20. The mask 30 is constructed of an opaque material and is performed to define a plurality of small holes therethrough. The further a hole is from the center of the aperture mask, the larger the diameter of the hole is. That is to say, a diameter of the holes near the center of the aperture mask are smaller than a diameter of the holes near the edge of the aperture mask. The positions and sizes of the holes are such as to allow the lenslets 26 of the transparent member 20 to project at least partially therethrough.

When assembled, the transparent structure 20 is mounted upon the circuit chip 10, and the lenslets 26 on the transparent structure 20 correspond in position to the detector areas 14 of the circuit chip 10. The aperture mask 30 is mounted on the transparent structure 20, such that each hole formed in the aperture mask 30 aligns with a corresponding lenslet 26 of the transparent structure 20. Last, the corrector lens 40 is mounted upon the aperture mask 30 and the filter 50 is mounted on the corrector lens 40.

When light from a remote object is incident upon the filter 50, the long wavelengths of the light are blocked so as to correct for the fact that most lenses focus differently for long wavelengths than they do for short wavelengths. Filtered light from the filter 50 is incident upon the corrector lens 40 and is collimated by the corrector lens 40 so that the light can impinge on the lenslets 26 perpendicular to the transparent structure 20. Light which impinges on the surface of the aperture mask 30 is prevented from passing through to the transparent structure 20. Only the light passing through the holes can pass through the aperture mask 30. This achieves the purpose of assuring that only of the detector areas 14 on the circuit chip 10 are illuminated; the non-detector areas 15 are not illuminated. This prevents generation of spurious signals caused by light impinging on circuit components in the non-detector areas 15.

Figure 3:
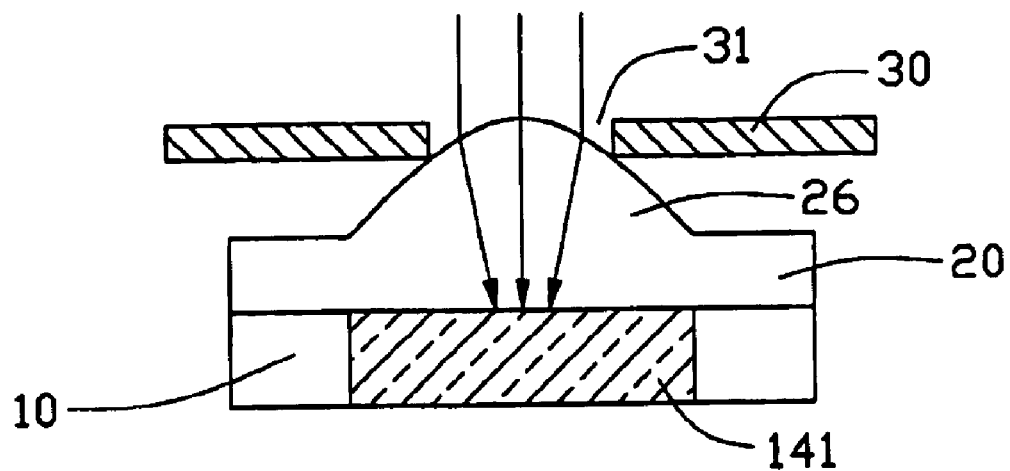
FIG. 3 is a sectional view of an assembled light aperture apparatus near a center of the light aperture apparatus of the present invention, showing a corresponding lenslet and detector area of the circuit chip.

Referring to FIG. 3 a hole 31 near the center of the light aperture apparatus 1 of the present invention is shown, along with a corresponding lenslet and detector area 141 of the circuit chip 10. Light from the corrector lens 40 is shown traveling downwards through the mask 30, and into the corresponding lenslet 26 of the transparent structure 20. The lenslet 26 focuses the light into the detector area 141. Because the holes 31 are smaller at the center of the mask 30, the light flux passed by the holes is limited, so the light illuminating the detector area 141 is limited.

Figure 4:
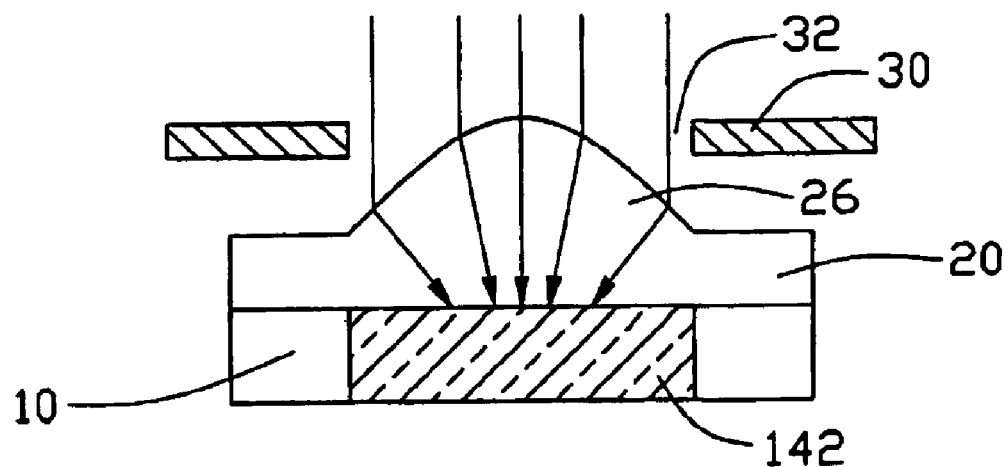
FIG. 4 is the same FIG. 3, but taken near a periphery of the light aperture apparatus of the present invention.
Figure 5:
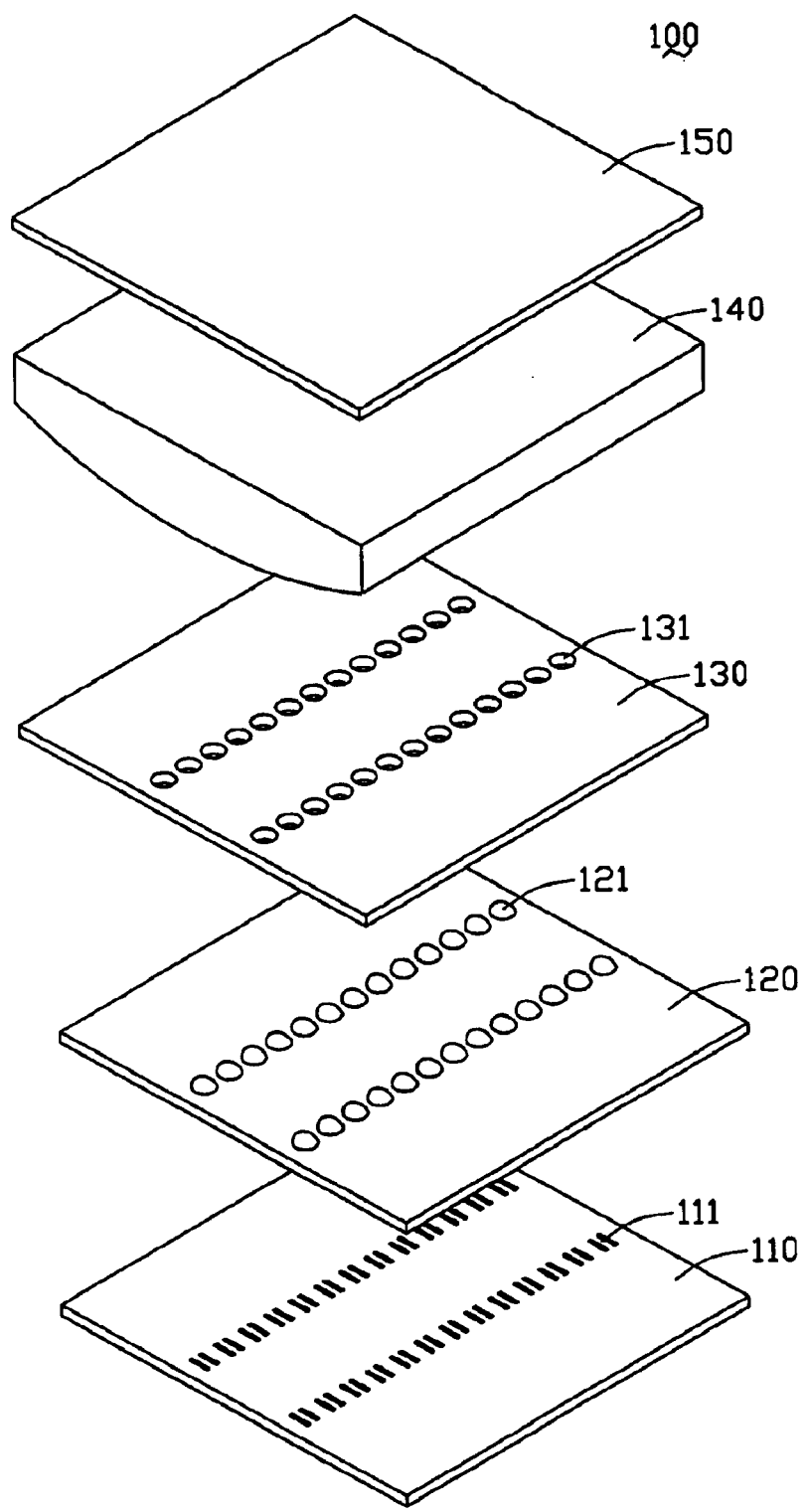
FIG. 5 is an exploded view of a conventional light aperture apparatus.

Referring to FIG. 4, a hole 32 further from the center of the aperture mask 30 is shown, along with a corresponding lenslet 26 and detector area 142. The hole 32 is much larger than the hole 31 and can pass a wider area of illumination for transmission through the lenslet 26, so the detector area 142 around a pixel (not shown) gathers more light to strengthen it's illuminance.

In a similar way, the closer a hole is to the center of the aperture mask, the smaller diameter of a light beam that can pass through it. Since the light flux passing through the corrector lens 40 is strongest in the center and weakest at the periphery, the narrow beams delivered to the central detector area 14, and the widen beams delivered to the peripheral detector area 14 in result in a substantially equal light flux illuminating each detector area 14. The aperture mask 30, therefore, has an equalizing influence on the amount of flux illuminating each detector area 14 over the whole circuit chip 10.

The apparatus of the present invention utilizes a light aperture or masking means defines a plurality of transparent portions such as holes which diameter is larger gradually from the center to edge of the apparatus aperture to weaken the illuminance of the center or strengthen the illuminance of the edge of the apparatus. By this means, the illuminance of the image is adjusted and evened, to achieve a clear and distinct image.

It is understood that the aperture mask 30 could be placed adjacent the circuit chip 10 and under the transparent structure 20. This arrangement could also be used to equalize a light flux impinging on each detector area 14.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An apparatus for use with an auto imaging machine, comprising:
   a circuit chip having a plurality of pixels, with a detector area around each pixel, and non-detector areas surrounding the detector areas;
   a transparent structure having a plurality of lenslets formed thereon, and being placed against the circuit chip so that each lenslet directs radiation from a remote object onto one corresponding detector area; and
   an aperture mask having a plurality of holes formed therein, each hole corresponding to one lenslet, the aperture mask being placed against the transparent structure so as to permit radiation to pass through the lenslet to the detector areas, and to block radiation incident on the aperture mask;
   wherein the diameter of the hole formed in the aperture mask becomes larger the further from the center of the aperture mask the hole is located.

2. The apparatus as claimed in claim 1, further including a corrector lens.

3. The apparatus as claimed in claim 1, wherein the aperture mask against the circuit chip and is positioned under the transparent structure.

4. The apparatus as claimed in claim 1, wherein each lenslet formed in the transparent structure is at least partially contained in the corresponding hole.

5. The apparatus as claimed in claim 1, wherein circuit components are confined to the non-detector areas of the circuit chip and are for processing signals from the detector areas.

6. The apparatus as claimed in claim 1, wherein the detector areas on the circuit chip are arranged in alternating order with the non-detector areas.

7. An apparatus for use with an auto imaging machine, comprising:
   a circuit chip having a plurality of pixels, with a detector area around each pixel, and non-detector areas surrounding the detector areas;
   a transparent structure having a plurality of lenslets formed thereon, and being placed against the circuit chip so that each of said lenslets directs radiation from a remote object onto one corresponding detector area; and
   an aperture mask having a plurality of openings formed therein, each of the openings corresponding to one lenslet, the aperture mask being placed against the transparent structure so as to permit radiation to pass through the lenslets to the detector areas, and to block radiation incident on the aperture mask;
   wherein the dimension of the hole formed in the aperture mask becomes larger in comparison with those of the holes located around a center of the aperture mask.

8. A method of forming images, comprising steps of:
   providing a circuit chip having a plurality of pixels, with a detector area around each pixel, and non-detector areas surrounding the detector areas;
   providing a transparent structure having a plurality of lenslets formed thereon, and being placed against the circuit chip so that each of said lenslets directs radiation from a remote object onto one corresponding detector area; and
   providing an aperture mask having a plurality of openings formed therein, each of the openings corresponding to one lenslet, the aperture mask being placed against the transparent structure so as to permit radiation to pass through the lenslets to the detector areas, and to block radiation incident on the aperture mask;
   wherein the dimension of the hole formed in the aperture mask becomes larger in comparison with those of the holes located around a center of the aperture mask.

* * * * *